US006712897B2

(12) United States Patent
Ayambem et al.

(10) Patent No.: US 6,712,897 B2
(45) Date of Patent: Mar. 30, 2004

(54) PRE-BLEND COMPOSITION, AND METHOD OF MAKING JOINT COMPOUND USING SAME

(75) Inventors: Amba Ayambem, East Amherst, NY (US); Richard E. Smith, Williamsville, NY (US); Salvatore Taravella, North Tonawanda, NY (US)

(73) Assignee: National Gypsum Properties, LLC., Charlotte, NC (US)

( * ) Notice: Subject to any disclaimer, the term of this patent is extended or adjusted under 35 U.S.C. 154(b) by 227 days.

(21) Appl. No.: 09/861,942

(22) Filed: May 21, 2001

(65) Prior Publication Data

US 2002/0195024 A1 Dec. 26, 2002

(51) Int. Cl.[7] .................... C09D 101/26; C09D 101/28; C09D 7/12
(52) U.S. Cl. ................. 106/189.1; 106/194.2; 106/197.01; 106/198.1
(58) Field of Search .......................... 106/187.1, 189.1, 106/194.2, 197.01, 198.1

(56) References Cited

U.S. PATENT DOCUMENTS

| | | |
|---|---|---|
| 3,891,582 A | 6/1975 | Desmarais ................ 260/17 R |
| 3,907,725 A | 9/1975 | Forte et al. .............. 260/17 R |
| 3,998,769 A | 12/1976 | Lane et al. ............ 260/17.4 ST |
| 4,069,062 A | 1/1978 | Burge ........................ 106/93 |
| 4,283,229 A | 8/1981 | Girg et al. ................. 106/171 |
| 4,287,103 A | 9/1981 | Green et al. ............. 260/17 R |
| 4,472,540 A | 9/1984 | Barker ....................... 523/220 |
| 4,661,161 A | 4/1987 | Jakacki et al. ............. 106/112 |
| 4,743,475 A | 5/1988 | Negri et al. ................ 427/387 |
| 4,799,962 A | 1/1989 | Ahmed ....................... 106/188 |
| 4,820,754 A | 4/1989 | Negri et al. .................. 524/44 |
| 4,824,879 A | 4/1989 | Montgomery et al. ........ 524/43 |
| 4,883,536 A | 11/1989 | Burdick ...................... 106/194 |
| 4,883,537 A | 11/1989 | Burdick ...................... 106/194 |
| 4,972,013 A | 11/1990 | Koltisko, Jr. et al. ....... 524/211 |
| 5,028,263 A | 7/1991 | Burdick ...................... 106/194 |
| 5,039,341 A | 8/1991 | Meyer ...................... 106/197.1 |
| 5,080,717 A | 1/1992 | Young ...................... 106/197.1 |
| 5,102,462 A | 4/1992 | Podlas ........................ 106/181 |
| 5,112,400 A | 5/1992 | Nae et al. ................. 106/197.1 |
| 5,228,908 A | 7/1993 | Burdick et al. ............. 106/194 |
| 5,228,909 A | 7/1993 | Burdick et al. ............. 106/194 |
| 5,258,069 A | 11/1993 | Knechtel et al. ........ 106/287.24 |
| 5,336,318 A | 8/1994 | Attard et al. ................ 106/780 |
| 5,653,797 A | 8/1997 | Patel .......................... 106/781 |
| 5,746,822 A | 5/1998 | Espinoza et al. ........... 106/785 |
| 5,779,786 A | 7/1998 | Patel .......................... 106/781 |
| 5,849,330 A | 12/1998 | Marvola et al. | |

FOREIGN PATENT DOCUMENTS

| | | | |
|---|---|---|---|
| CA | 2039124 | * | 6/1991 |
| EP | 0 357 962 A | | 3/1990 |

OTHER PUBLICATIONS

"Material Safety Data Sheet: Product Code: 06059, Product Name: XUS 40320.00L Experimental Polymer," effective date: Jul. 26, 1991, date printed (Sep. 19, 1991,) Dow Chemical U.S.A., Midland, Michigan, 3 pages.

Thomas G. Majewicz and Thomas J. Podlas, "vol. 5: Cellulose Ethers," Aqualon Company, pp. 541–563 no date provided.

Aida Kagaku Kogyo KK, *Patent Abstracts of Japan*, vol. 1997, No. 7 (Jul. 31, 1997).

*International Search Report*, PCT/US02/11725 no date provided.

Matsushita Electric Works Ltd., *Database WPI*, Section Ch, Week 197922, Derwent Publications, Ltd., London, GB, AN 1979–41193B (Apr. 1979).

* cited by examiner

*Primary Examiner*—David Brunsman
(74) *Attorney, Agent, or Firm*—Howrey, Simon, Arnold & White, LLP; Anthony Nimmo

(57) ABSTRACT

A pre-blend composition for preparation of joint compound including water, a cellulose ether thickener, and about 19% or less by weight of a salt selected from the group consisting of potassium carbonate, potassium sulfate, sodium acetate, and mixtures thereof, wherein the composition is essentially free of alumina, is disclosed.

38 Claims, No Drawings

PRE-BLEND COMPOSITION, AND METHOD OF MAKING JOINT COMPOUND USING SAME

BACKGROUND OF THE INVENTION

1. Field of the Invention

The invention generally relates to pre-blend compositions useful in the production of cementitious compositions and, more specifically, the invention relates to the production of cementitious compounds using a pre-blend composition containing water, a cellulose ether thickener, and a salt.

1. Brief Description of Related Technology

A common manner of constructing interior walls includes the use of inorganic wallboard panels or sheets such as gypsum wallboard, often referred to simply as "wallboard" or "drywall." Wallboard is typically produced by enclosing a core of an aqueous slurry of gypsum and other additives between two large sheets of paper. After the gypsum slurry has set and dried, the sheet is cut into standard sizes.

A wall is generally made by securing, e.g., with screws and/or nails, the wallboard to a support structure, for example vertically or horizontally-oriented pieces of wood. Because wallboard is typically supplied in standard-sized sheets or panels, when forming a wall from the sheets there will generally be a number of joints between adjacent sheets. In most wallboard construction, it is necessary to conceal these joints between adjacent panels so that the wall will have a smooth, monolithic finish similar to that obtained with conventional wet plaster methods. It is also typically necessary to conceal the screws and/or nails used to secure the wallboard panels to framing, the indentations caused by the screws and/or nails, imperfections in the wallboard panels, and other materials (e.g., corner beads) used to form the wall.

A number of joint compound compositions (sometimes referred to by applicators as "mud") that can be used to conceal the joints between adjacent sheets of wallboard, other imperfections in the wallboard, and other construction points (e.g., corner beads) are known.

To conceal the joints between wallboard panels, a joint compound is typically applied in several layers or coats. A first coat of joint compound is placed in the joint between the wallboards with a wallboard knife, blade, or trowel. The first coat is primarily for the purpose of filling the space between the adjacent wallboards. Joint tape (for example, made of paper) can then be embedded into the first coat of joint compound. The joint compound may be applied in several, e.g., three, coats or layers in order to obtain a smooth finish. Each coat of joint compound must be allowed to dry or set prior to the placement of the next coat of joint compound. (If the prior coat is not allowed to dry or set, problems such as excess shrinkage and/or cracking can occur.) Once dry or set, the treated area is sanded before applying the next finishing coat of joint compound.

Joint compounds can be used for other purposes, for example, to repair imperfections in various building materials and for adding texture to walls and ceilings.

There are many different types of joint compounds. Joint compounds can be supplied in a dry powder form or in a mill-mixed, ready-mix form. They can also be of a "drying" type or a "setting" type.

The joint compound can be supplied in the form of a dry powder, to which an amount of water is added at the work site by the applicators to give the joint compound a suitable consistency. Other joint compounds, often referred to as "ready-mix" or "ready-mixed" joint compounds, are pre-mixed with water and other additives during manufacturing of the product. These joint compounds are generally packaged and sold in a corrugated box or plastic pail in a form that is suitable for use with little or no addition of water at the job site.

Among the prior art joint compound compositions, it is generally known to use a filler (e.g., calcium carbonate, calcium sulfate hemihydrate, and calcium sulfate dihydrate), thickener, preservative, and a binder, as well as various other additives to produce a joint compound, as disclosed in U.S. Pat. No. 5,653,797 (Aug. 5, 1997), the disclosure of which is hereby incorporated herein by reference. Typical thickeners include hydroxyethylcellulose (HEC) and hydroxypropylmethylcellulose (HPMC).

Many joint compounds are of the "drying" or "setting" type. Drying-type joint compounds can contain calcium carbonate ($CaCO_3$; i.e., limestone) and/or calcium sulfate dihydrate ($CaSO_4.2H_2O$) and/or talc ($Mg_3Si_4O_{10}(OH)_2$ or $3MgO.4SiO_2.H_2O$). Prior to use (generally during manufacturing), these components and a binder (along with several other ingredients) are mixed for a specific time with water. The drying-type joint compound thus produced has a high ionic content and basic pH. After application, when the compound dries (e.g., water evaporates), a dry, relatively hard cementitious material remains. The calcium sulfate dihydrate and calcium carbonate can comprise a substantial portion of what is sometimes referred to as the filler component.

General ranges of ingredients used in an all purpose, conventional-weight, drying-type joint compound include the ingredients shown in Table 1, below.

TABLE 1

CONVENTIONAL WEIGHT JOINT COMPOUND

| Ingredient | Weight Percentage |
| --- | --- |
| water | 20–37 |
| preservative | 0.02–1.0 |
| calcium carbonate | 10–100 |
| mica (filler) | 0.5–5.0 |
| attapulgite clay (non-leveling agent) | 0.5–5.0 |
| cellulose thickener | 0.12–1.0 |
| latex (binder) | 1.0–4.0 |

One of the factors limiting the rate of joint compound manufacture is the relatively long time necessary to completely disperse and dissolve a water soluble polymer thickener, typically a cellulose ether thickener, in a joint compound mixture. The thickener is treated to reduce the rate of dissolution ("surface treated") by cross-linking hydroxyl groups on a cellulose ether chain. An aqueous solution of the treated thickener is added to the remaining joint compound ingredients, and thoroughly mixed. As these crosslinked groups are hydrolyzed, the cellulose ether dissolves. Thus, the rate of thickening is controlled by the amount of surface treatment. If the cellulose ether thickener has no surface treatment, it would dissolve immediately upon introduction into the water, and would form lumps or "fish eyes" that are very difficult to break up and disperse. Thus, in the typical process, the thickener is surface treated to achieve a rate of dissolution of about 10 to 15 minutes, so that it is well dispersed prior to thickening.

Likewise, if the thickener is one of the first components added to water in a joint compound manufacturing process, followed by fillers, binders, etc., then it also takes a substantially long time to fully disperse the ingredients to a homogeneous mixture (e.g., at least 30 minutes), and the process requires a substantially higher mechanical energy input because of the high torque required to mix the viscous, thickened mixture.

A mixture of a cellulose ether thickener and water also presents other problems. Cellulose ether solutions in water may be prepared only up to relatively low concentrations (e.g., about 2 wt. % to about 4 wt. %), thus creating a physical problem in storing and transporting relatively large quantities of liquid. As discussed above, cellulose ether solutions have a viscous, adhesive consistency, especially within the upper concentration range, and this property causes the solution to adhere to the walls of containers, to tubes and to pumps, and necessitates a troublesome cleaning of such equipment.

It is also known to use organic solvents to dissolve or suspend cellulose ethers. However, when cellulose ethers are to be used in mortar, concrete, and joint compound mixtures, organic solvents are unsuitable, because they frequently affect the setting characteristics of these mixtures in an undesirable manner.

To avoid various disadvantages of the drying-type of joint compound, compounds of the "setting type" have been developed. A setting-type joint compound generally includes calcium sulfate hemihydrate ($CaSO_4 \cdot \frac{1}{2}H_2O$, also referred to as calcined gypsum). (See U.S. Pat. No. 5,653,797.) To produce calcined gypsum, calcium sulfate dihydrate is converted from raw gypsum to the hemihydrate state via a suitable calcination process. A gypsum calcination process removes one and one-half molecules of water from each calcium sulfate dihydrate gypsum molecule. The hemihydrate form of calcium sulfate is substantially more soluble in water than the dihydrate form of calcium sulfate. The calcium sulfate hemihydrate may comprise a substantial portion of what is sometimes referred to as the filler component in a setting-type joint compound.

During use in a setting-type joint compound, the calcium sulfate hemihydrate is rehydrated to the dihydrate state via the addition of water. This rehydration process normally takes place over a fairly short period of time. Accordingly, it has been extremely difficult to produce a setting-type joint compound comprising hemihydrate gypsum pre-mixed with water, because the product would set in its storage container. Thus, joint compounds of the setting-type have typically been supplied in the powder form, but ready-mixed setting-type joint compounds are also known.

Setting-type joint compounds have the advantage of having generally quicker finishing times (setting time) than drying-type joint compounds. This is advantageous for the reasons stated above. Further, because setting joint compounds form a crystalline network upon setting (as opposed to merely drying), these compounds typically provide a strong, more durable bond between adjacent wallboard sheets than do drying-type joint compounds. However, because these compounds provide a strong crystalline network upon setting, the joint compound is often harder to sand to a smooth finish.

Accordingly, it would be desirable to provide a pre-blend composition for preparation of joint compound that contains a large concentration of cellulose ether thickener, has a suitable viscosity such that it is pumpable, is compatible with fillers used in setting type and drying type joint compounds, and is storage-stable over long periods of time. It would also be desirable to provide methods of preparing such a pre-blend and joint compounds produced thereby.

SUMMARY OF THE INVENTION

It is an objective of the invention to overcome one or more of the problems described above.

Accordingly, one aspect of the invention is a composition for preparation of joint compound, the composition comprising: a cellulose ether thickener; and about 19% by weight or less of a salt selected from the group consisting of potassium carbonate, potassium sulfate, sodium acetate, and mixtures thereof; wherein the composition is essentially free of alumina.

Another aspect of the invention is a composition for preparation of joint compound, the composition comprising: a cellulose ether thickener; and a salt selected from the group consisting of potassium carbonate, potassium sulfate, sodium acetate, and mixtures thereof, having a weight ratio of cellulose ether thickener to salt of at least about 0.75 to 1; wherein the composition is essentially free of alumina.

Still another aspect of the invention is a method of preparing a pre-blend composition for preparation of joint compound including the steps of preparing a mixture of water and a salt selected from the group consisting of potassium sulfate, potassium carbonate, sodium acetate, and mixtures thereof; followed by adding a cellulose ether to form a pre-blend composition, wherein the salt makes up 19% by weight or less of the pre-blend composition and the composition is essentially free of alumina.

Further aspects and advantages of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to the specific embodiments described herein.

DETAILED DESCRIPTION OF THE INVENTION

The invention is directed to a pre-blend composition that includes a cellulose ether thickener, and a method of preparing a joint compound using the pre-blend composition.

A pre-blend composition according to the invention suspends a cellulose ether thickener in a solution of water and a salt selected from the group consisting of potassium carbonate, potassium sulfate, sodium acetate, and mixtures thereof. Optionally, but preferably, additional ingredients such as a binder, attapulgite clay, and a glycol, can be added. The pre-blend composition can be stored over a period of time, and then added to a mixture of water and filler material to form a composition suitable for use as a joint compound.

Suitable salts for use in the invention are potassium carbonate, potassium sulfate, and sodium acetate. Mixtures of one or more salts can also be used. Preferably, the salt will be selected and metered to provide a suitable pre-blend composition that has a pH preferably in the range of about 7 to about 10, more preferably about 7 to about 8.5. Sodium acetate is preferred.

The salt is added in an amount suitable to suspend (i.e., hinder dissolution of) a cellulose ether thickener used in the pre-blend composition of the invention. The amount of salt will depend on factors including the particular salt used, the particular cellulose ether thickener used, the amount of cellulose ether thickener used, and the amounts and types of other additives used in a pre-blend composition according to the invention. Generally, the amount of salt is at least about 1% and up to about 35% by weight of the composition, preferably at least about 4% and up to about 12% by weight. Preferably, the minimum amount of salt is at least about 3 wt %, more preferably at least about 5% by weight.

A pre-blend composition according to the invention can suspend more cellulose ether than previously known methods using less salt, and essentially free of alumina (or without the use of alumina). Alumina as used herein means either finely divided aluminum oxide ($Al_2O_3$), especially pyrogenic $Al_2O_3$, in one of the known modifications, or finely divided aluminum hydroxide. The term alumina also includes all known transition forms between aluminum oxides and aluminum hydroxides, e.g., AlO(OH) =$Al_2O_3 \cdot H_2O$. The term "essentially free" with respect to alumina means that the alumina is present at less than 0.1% by weight, preferably less than about 0.05% by weight, more preferably about 0% by weight, based on the combined weight of the salt and water.

The ability to use less salt saves on material costs and permits a broader range of formulations of a final joint compound composition made from a pre-blend composition according to the invention. Thus, the amount of salt preferably is about 19% by weight or less, more preferably about 15% by weight or less, most preferably about 10% by weight or less of the composition. In another aspect of the invention, the weight ratio of cellulose ether thickener to salt preferably is in a range of about 0.5:1 to about 1:0.5, more preferably about 0.75:1 to about 1.25:1, for example at least about 0.75 or at least about 1:1. In a particular preferred embodiment the weight ratio is greater than 1.25:1.

Typical tap water is suitable for use in the invention, as are distilled and de-ionized water.

A preferred cellulose ether thickener for use in the invention is methyl hydroxypropyl cellulose ("MHPC"; also called hydroxypropylmethylcellulose, "HPMC", and hydroxymethylpropyl cellulose, "HMPC"). Methyl hydroxypropyl cellulose is water soluble, and swells when added to water (e.g., normal tap water or distilled water), resulting in a thickened solution. The METHOCEL family of HPMCs, sold by the Dow Chemical Company of Midland, Mich., are suitable HPMCs for use in the invention. Preferably, the cellulose ether thickener for use in the invention will be water soluble.

The degree of substitution, e.g., methyl and propyl substitutions for MHPC, can affect the properties of a particular cellulose ether. For example, METHOCEL 40320 brand MHPC and METHOCEL 240S brand MHPC, both proprietary compositions sold by Dow Chemical Company, have viscosities of 75,000 cps and 40,000 cps, respectively, for a 2% solution.

Other cellulose ether thickeners include methyl cellulose, alkyl-dycdroxylakyl celluloses, preferably methyl hydroxyethyl cellulose and ethyl hydroxyethyl cellulose, hydroxyethyl cellulose, hydrophobically modified hydroxyethyl cellulose, carboxymethyl cellulose, and polyethylene oxide.

Preferably, the more cellulose ether that can be suspended in a pre-blend composition, the more efficient is a process according to the invention. For example, less pre-blend composition will need to be stored and added to a given quantity of water and filler to create a complete joint compound formulation. Thus, preferably the amount of cellulose ether in a pre-blend composition according to the invention preferably is about 1% by weight to about 40% by weight, more preferably about 5% by weight to about 30% by weight, most preferably at least about 9% by weight, for example about 9% by weight to about 25% by weight.

Various optional additives can be used in a pre-blend composition according to the invention. Preferred optional additives will enhance properties such as fluidity and pumpability or, at a minimum, will not detrimentally affect such properties to a large degree. The addition of optional ingredients also serves to disperse the suspended cellulose ether throughout the pre-blend composition, which will prevent the formation of lumps or "fish eyes" if a portion of the cellulose ether begins to dissolve.

Some preferred optional additives include ingredients which can be desirable in a complete joint compound composition. Such additives include attapulgite clay, binders, and stabilizers. In some cases, these additives can also enhance properties such as fluidity and pumpability in a pre-blend composition according to the invention. Additives such as attapulgite clay, binders, and glycols help provide a more homogeneous pre-blend composition, rather than a more soup-like composition that has cellulose ether settled to the bottom of the composition.

Attapulgite clay (also known as attapulgus clay and hydrated magnesium aluminum silicate) preferably is added to a pre-blend composition according to the invention. The attapulgite clay contributes to the slurry/pasty nature of a pre-blend composition according to the invention, providing the composition with a gel-like appearance upon settling. Without intending to be bound by any particular theory, it is believed that the gel-like appearance is due to electrostatic attraction and repulsion of charges on the clay surface and to hydrogen bonding. The attapulgite clay enhances the ability of a composition according to the invention to slip easily when pumped. A suitable attapulgite clay is ATTAGEL M8113 clay, supplied from Engelhard Corp. of Iselin, N.J. SUPERGEL B clay, available from Millwhite Company of Houston, Tex. is an alternative to ATTAGEL M8113 clay.

Attapulgite clay preferably is added to a composition of the invention at about 0% by weight to about 20% by weight, preferably at least about 2% by weight, more preferably at least about 5% by weight, for example about 6% by weight to about 10% by weight.

A pre-blend composition according to the invention preferably includes a binder. The binder is normally a coalescable vinyl material, such as latex, polyvinyl alcohol, (poly) vinyl acetate and ethylene-vinyl acetate copolymer. Other materials that are useful as binders include starch and casein. Latex is preferred. Latex binders are sold by Air Products and Chemicals Inc. of Allentown, Pa. under the trade names Airflex 526, Airflex 528, and Reichhold Chemicals Inc. of Research Triangle Park, N.C. under the name Reichhold 40716. Polyvinyl alcohol is also available from Air Products and Chemicals Inc. Suppliers of suitable latex also include: National Starch of Bridgewater, N.J. and Fuller Chemical Company of St. Paul, Minn.

In a complete joint compound made from a pre-blend composition of the invention, the binder provides bond strength and adhesion of the joint compound to the substrate (e.g., wallboard). Upon drying or curing of the joint compound, it forms a thin matrix to hold the limestone, clay and other components.

A binder preferably is used in a pre-blend composition according to the invention at about 0% by weight to about 4% by weight, more preferably about 1% by weight to about 3% by weight, for example 2% by weight.

Latex as received from commercial sources invariably contains suspension stabilizers in the form of surfactants, which, to some extent, also aid in the dispersion of the suspended cellulose ether particles. When not present in a binder as-supplied, a stabilizer can be added. Suitable stabilizers include polyvinyl alcohol (which can also be used alone as a binder), sodium dodecyl benzene, poly(ethylene glycol) ether, and the like, and can be added at 0% by weight to about 0.2% by weight, preferably about 0.02% by weight to about 0.12% by weight, for example 0.05% by weight, based on the weight of the pre-blend composition.

A pre-blend composition of the invention preferably includes a glycol that provides humectant and/or lubricant properties. Such glycols include, glycerol, hexylene glycol, ethylene glycol, diethylene glycol, propylene glycol, pentaerythritol, and the like. Diethylene glycol is preferred.

A glycol preferably is used in a pre-blend composition according to the invention at about 0% by weight to about 30% by weight, preferably greater than 10% by weight, in some cases preferably greater than 20% by weight, most preferably about 10% by weight to about 25% by weight.

A pre-blend composition of the invention preferably includes a preservative. Suitable preservatives are sold, for example, under the trade names Troysan 364 and Troysan 174 by Troy Chemicals of East Hanover, N.J. A pre-blend composition of the invention preferably includes 0% to about 3% by weight of a preservative, preferably about 0.2% by weight to about 2% by weight, for example 1% by weight.

A stabilizer, such as xanthan gum, can be used in a composition according to the invention at 0% to about 1% by weight, preferably about 0.1% by weight to about 0.3% by weight, for example about 0.2% by weight. Xanthan gum can be obtained from Kelco Company under the trade name KELZAN. It is a linear polymer with a molecular weight in excess of 1 million, comprising a B-linked backbone containing D-glucose, D-mannose and D-glucuronic acid with 1 D-mannose side-chain unit for every eight sugar residues and 1 D-glucose side-chain residue for every sixteen sugar residues. The molar ratio of D-glucose to D-mannose to D-glucuronic acid is about 2.8/3.0/2.0. In water it forms a hydrophilic colloid. Its viscosity is essentially stable at about 1000 cps from 0° C. to 100° C. and from a pH of 1 to 11. Xanthan gum can also act as a slip agent.

Sorbitol can be used in a pre-blend composition according to the invention at about 0% to about 2% by weight, preferably about 0.1 to about 1% by weight.

A pre-blend composition according to the invention has a viscosity such that it can be pumped without the need for specialized equipment, for example about 1000 BU (Brabender units) or less, preferably about 600 BU or less.

A pre-blend composition according to the invention is storage-stable for a period of time such that it can be made, stored, and used to produce several batches of joint compound at a time subsequent to its preparation, for example at least one day. If the pre-blend composition thickens during storage, handling difficulties present themselves. For example, if the composition becomes too viscous to pump, valuable time can be lost due to the need to clean out equipment and attempt to salvage the pre-blend composition for later use. In some cases, any subsequent tampering with the formulation of the pre-blend composition can result in a joint compound that is not suitable for use and, in such cases, an entire batch of pre-blend would need to be disposed of. Thus, lengthy storage stability is desirable.

Preferably, a pre-blend composition according to the invention is such that it remains pumpable (e.g., has a viscosity of about 600 BU or less) for at least one day. As noted above, cellulose ethers, depending on molecular weight, can vary to the degree in which they increase the viscosity of a solution upon thickening. For some cellulose ethers, a 2% solution by weight has a very high viscosity, too high for pumping via normal means. On the other hand, a 2% solution of a cellulose ether having a lower molecular weight will have a lower viscosity, and could be pumpable via normal means.

Preferably, a pre-blend composition according to the invention is storage stable (i.e., does not thicken to a detrimental degree) for a period long enough to prepare, store, and use the pre-blend composition to prepare several batches of joint compound, thus realizing some efficiencies of the invention. Storage stability of at least one day is preferred in a typical industrial joint compound preparation operation, whereas stability periods of at least a month or six months can have advantages in various other scenarios.

Thus, preferably a pre-blend composition according to the invention is such that at least about 75%, more preferably at least about 90%, most preferably at least about 95% of the cellulose ether thickener in the composition is suspended for at least one day, more preferably at least one month. Put another way, a pre-blend composition according to the invention preferably has a viscosity of about 600 BU or less after a storage period of about one day, more preferably after about one month.

Preferably, the pre-blend composition will result in a joint compound that has a suitable pH, preferably in within the range of pHs found in conventional joint compounds acceptable to consumers. For example, a pre-blend composition preferably will result in a joint compound having a pH in a range of about 6 to 10, more preferably about 7 to 8.5.

To prepare a pre-blend composition and achieve the efficiencies of the invention, a salt should be added to water prior to adding a cellulose ether. Otherwise, the cellulose ether will thicken in the water, and more time and energy will need to be expended to disperse the salt and suspend the cellulose ether thickener. The various other optional ingredients can be added in any order. One preferred order of addition is water, binder, salt, and then cellulose ether, optionally followed by glycol, and then attapulgite clay. Another preferred order of addition is water, attapulgite clay, salt, cellulose ether, and then glycol.

To prepare a joint compound from a pre-blend composition according to the invention, the pre-blend composition is added to a mixture including water and a filler. Preferably, the pre-blend composition, water, and filler are mixed during addition to provide a homogeneous joint compound composition. As the pre-blend slurry is added to the mixture of water and filler, the concentration of salt decreases and the cellulose ether dissolves, thickening (i.e., increasing the viscosity of) the resultant mixture. Thus, any additional components desired in the final joint compound preferably should be added either prior to or concurrently with the pre-blend composition to allow for easy, thorough distribution in the joint compound.

Any filler suitable for use in a joint compound can be used in a method according to the invention. The conventional fillers are calcium carbonate, calcium sulfate dihydrate (gypsum), calcium sulfate hemihydrate (plaster of Paris), and fibrous material. Other suitable fillers, useful in light-weight joint compounds, for example, include talc, mica, perlite, and sericite. Mica suitable for use with the invention is available, for example, from Sparton Mica Company of Pacolet, S.C. and Franklin Minerals of Nashville, Tenn. The perlite can be a silicone or silane treated expanded perlite. Suitable perlites are available from Silbrico Corp. of Hodgkins, Ill. and Grefco Inc. of Torrance, Calif. When used in a joint compound formed by a method of the invention, mica, talc and/or sericite provide resistance to cracking upon drying.

Any ingredient suitable for use in a joint compound can be used in a method according to the invention to produce a joint compound. Suitable optional ingredients, frequently used in joint compounds, are preservatives, wetting agents, defoamers and plasticizers. For example, FUNGITROL 158 is a fungicide made by Huls America, Inc. which can be used in a method according to the invention to produce a joint compound. TROYSAN 174 is a preservative made by the Troy Chemical Company which is used for preservation of joint compounds. These ingredients can be used at low concentrations, preferably about 0.05% to about 1% of the total dry weight.

The optional ingredients described above for use in a pre-blend composition according to the invention can also be used in a method according to the invention to produce a joint compound. For example, attapulgite clay can be added to a pre-blend composition of the invention, to a water and filler mixture used in a method according to the invention to produce joint compound, or both. Such optional ingredients can be used in any amount that produces a suitable joint compound, preferably in the same amounts used in conventional joint compounds acceptable to consumers.

Preferably, a joint compound produced according to a method of the invention will have a suitable pH, preferably in within the range of pHs found in conventional joint compounds acceptable to consumers. For example, a joint compound produced according to a method of the invention will have a pH in a range of about 6 to 10, more preferably about 7 to 8.5.

EXAMPLES

The following examples are provided to illustrate the invention but are not intended to limit the scope of the invention.

Example 1
MHPC and Potassium Carbonate

A pre-blend composition was obtained by combining each of the following materials in the specific order and amounts listed below:

| water | 100 ml |
|---|---|
| latex | 4 grams |
| potassium carbonate | 10 grams |
| MHPC cellulose ether (METHOCEL 40320) | 21 grams |
| diethylene glycol | 41.49 grams |
| sorbitol | 0.91 grams |
| attapulgite clay | 15 grams |

A 10% solution of potassium carbonate in water had a pH of about 10.7. The pre-blend composition had a viscosity of about 460 BU, as measured using a 0.25 inch paddle. The pre-blend composition was stored for about one year without any noticeable thickening.

Example 2
MHPC and Potassium Sulfate

A pre-blend composition was obtained by combining each of the following materials in the specific order and amounts listed below:

| water | 100 ml |
|---|---|
| latex | 4 grams |
| potassium sulfate | 10 grams |
| MHPC cellulose ether (METHOCEL 40320) | 17.5 grams |
| diethylene glycol | 18 grams |
| attapulgite clay | 12 grams |

A 10% solution of potassium sulfate in water had a pH of about 7.7. The pre-blend composition had a viscosity of about 460 BU, as measured using a 0.25 inch paddle. The pre-blend composition was stored for about two weeks without any noticeable thickening.

Example 3
MHPC and Sodium Acetate

A pre-blend composition was obtained by combining each of the following materials in the specific order and amounts listed below:

| water | 75 ml |
|---|---|
| sodium acetate | 10 grams |
| MHPC cellulose ether (METHOCEL 40320) | 20 grams |
| diethylene glycol | 41.5 grams |
| sorbitol | 1.0 gram |
| attapulgite clay | 15 grams |

A 10% solution of sodium acetate in water had a pH of about 7.66. The pre-blend composition had a viscosity of about 460 BU, as measured using a 0.25 inch paddle. The pre-blend composition was stored for about one week without any noticeable thickening.

Example 4
Joint Compound Made From MHPC/Potassium Sulfate Pre-Blend

About 178.5 grams of the pre-blend of Example 2 was added to a mixture containing the following components, in the amounts shown, while mixing to prepare a joint compound.

| water | 1200 grams |
|---|---|
| limestone | 2758 grams |

The cellulose ether began to thicken over time, and the joint compound was complete in about 40 minutes. The joint compound thus prepared had a pH of about 7.9, as estimated by the use of litmus paper.

Example 5
Joint Compound Made From MHPC/Sodium Acetate Pre-Blend

About 178.5 grams of the pre-blend of Example 3 was added to a mixture containing the following components, in the amounts shown, while mixing to prepare a joint compound.

| water | 1200 grams |
|---|---|
| limestone | 2758 grams |

The cellulose ether began to thicken within a very short period of time (e.g., seconds), and the joint compound was complete in about 10 minutes. The joint compound thus prepared had a pH of about 8.2, as estimated by the use of litmus paper.

The foregoing description is given for clearness of understanding only, and no unnecessary limitations should be understood therefrom, as modifications within the scope of the invention may be apparent to those having ordinary skill in the art.

What is claimed is:

1. A pre-blend composition for preparation of joint compound, comprising:

a cellulose ether thickener; and a salt selected from the group consisting of potassium sulfate, sodium acetate, and mixtures thereof in an amount suitable to suspend the cellulose ether thickener;

wherein said composition is essentially free of alumina, and the salt is present at a concentration of up to about 19% by weight of the composition.

2. The composition of claim 1, wherein said salt is present at a concentration of about 4% by weight to about 15% by weight of the composition.

3. The composition of claim 1, wherein said salt is present at a concentration of about 4% by weight to about 19% by weight of the composition.

4. The composition of claim 1, wherein said cellulose ether thickener and said salt are present in the composition in a weight ratio of at least about 0.75 to 1.

5. The composition of claim 1, wherein said cellulose ether thickener is methyl hydroxypropyl cellulose.

6. The composition of claim 1, wherein said salt is sodium acetate.

7. The composition of claim 1, wherein said cellulose ether comprises at least about 9% of the composition by weight.

8. The composition of claim 1, comprising attapulgite clay.

9. The composition of claim 1, comprising a binder.

10. The composition of claim 1, having a pH in the range of about 7 to about 10.

11. The composition of claim 1, having a viscosity of about 1000 BU or less.

12. The composition of claim 1, wherein at least about 75% of said cellulose ether remains suspended for at least one day.

13. A pre-blend composition for preparation of joint compound, comprising water;

a cellulose ether thickener; and a salt selected from the group consisting of potassium sulfate, sodium acetate, and mixtures thereof;

wherein the weight ratio of cellulose ether thickener to salt is at least about 0.75 to 1 and said composition is essentially free of alumina.

14. The composition of claim 13, wherein said salt is sodium acetate.

15. The composition of claim 13, wherein said weight ratio is at least about 1 to 1.

16. The composition of claim 15, wherein said weight ratio is greater than 1.25 to 1.

17. The composition of claim 13, wherein said salt is present in an amount suitable to suspend the cellulose ether thickener at a concentration of up to about 19% by weight of the composition.

18. The composition of claim 13, wherein said cellulose ether thickener is methyl hydroxypropyl cellulose.

19. The composition of claim 13, comprising attapulgite clay.

20. The composition of claim 13, comprising a latex binder.

21. The composition of claim 13, having a pH in the range of about 7 to about 10.

22. The composition of claim 13, having a viscosity of about 1000 BU or less.

23. The composition of claim 13, wherein at least about 75% of said cellulose ether remains suspended for at least one day.

24. A composition for preparation of joint compound, the composition comprising water, methyl hydroxypropyl cellulose, attapulgite clay, a binder, a glycol, and about 4% by weight to about 19% by weight of a salt selected from the group consisting of potassium sulfate, potassium carbonate, sodium acetate, and mixtures thereof.

25. The composition of claim 24, having a weight ratio of cellulose ether thickener to salt of at least about 0.75 to 1.

26. The composition of claim 24, wherein said weight ratio is greater than 1.25 to 1.

27. A method of preparing a pre-blend composition for preparation of joint compound comprising the steps of:

a) preparing a mixture of water and a salt selected from the group consisting of potassium sulfate, potassium carbonate, sodium acetate, and mixtures thereof in an amount suitable to suspend the cellulose ether thickener; followed by b) adding a cellulose ether to the mixture of step a) to form a pre-blend composition, wherein said salt is present at a concentration of up to about 19% by weight of the composition, and said pre-blend composition is essentially free of alumina.

28. The method of claim 27, comprising the step of adding attapulgite clay to a product of steps a) or b).

29. The method of claim 27, comprising the step of adding a binder to a product of steps a) or b).

30. The method of claim 27, wherein said cellulose ether comprises at least about 9% of the composition by weight.

31. The method of claim 27, wherein said cellulose ether thickener and said salt are present in the composition in a weight ratio of at least about 0.75 to 1.

32. The method of claim 27, wherein said cellulose ether thickener is methyl hydroxypropyl cellulose.

33. The method of claim 27, wherein said salt is sodium acetate.

34. The method of claim 27, wherein said pre-blend composition has a pH in the range of about 7 to about 10.

35. The method of claim 27, comprising the steps of:

adding a binder;

adding attapulgite clay; and adding a glycol.

36. The method of claim 35, comprising the subsequent steps of adding said pre-blend composition to a composition comprising water and a filler, and mixing the resultant composition, whereby a joint compound is produced.

37. A joint compound produced by the method of claim 36.

38. The method of claim 36, wherein said joint compound has a pH in the range of about 7 to about 10.

* * * * *